US006460050B1

(12) United States Patent
Pace et al.

(10) Patent No.: US 6,460,050 B1
(45) Date of Patent: Oct. 1, 2002

(54) DISTRIBUTED CONTENT IDENTIFICATION SYSTEM

(76) Inventors: Mark Raymond Pace, 42 15$^{th}$ Ave., San Mateo, CA (US) 94402; Brooks Cash Talley, 40 15$^{th}$ Ave., San Mateo, CA (US) 94402

(*) Notice: Subject to any disclaimer, the term of this patent is extended or adjusted under 35 U.S.C. 154(b) by 0 days.

(21) Appl. No.: 09/469,567

(22) Filed: Dec. 22, 1999

(51) Int. Cl.$^7$ .......................... G06F 17/00; G06F 15/16
(52) U.S. Cl. ..................... 707/104.1; 707/10; 709/203; 709/206
(58) Field of Search ................................ 707/9, 6, 104, 707/7, 10, 104.1; 709/201, 202, 204, 225, 203, 206

(56) References Cited

U.S. PATENT DOCUMENTS

| | | | |
|---|---|---|---|
| 5,465,353 A | * 11/1995 | Hull et al. | 707/5 |
| 5,515,513 A | * 5/1996 | Metzger et al. | 709/249 |
| 5,619,648 A | * 4/1997 | Canale et al. | 709/206 |
| 5,884,033 A | * 3/1999 | Duvall et al. | 709/206 |
| 5,999,932 A | * 12/1999 | Paul | 707/10 |
| 6,052,709 A | * 4/2000 | Paul | 709/202 |
| 6,094,487 A | * 7/2000 | Butler et al. | 380/270 |
| 6,144,934 A | * 11/2000 | Stockwell et al. | 704/1 |
| 6,167,457 A | * 12/2000 | Eidson et al. | 709/328 |
| 6,178,417 B1 | * 1/2001 | Syeda-Mahmood | 707/3 |
| 6,189,026 B1 | * 2/2001 | Birrell et al. | 709/206 |
| 6,195,698 B1 | * 2/2001 | Lillibridge et al. | 709/225 |
| 6,199,081 B1 | * 3/2001 | Meyerzon et al. | 707/513 |
| 6,199,102 B1 | * 3/2001 | Cobb | 709/206 |
| 6,249,805 B1 | * 6/2001 | Fleming, III | 709/206 |
| 6,310,966 B1 | * 10/2001 | Dulude et al. | 382/115 |
| 6,321,267 B1 | * 11/2001 | Donaldson | 709/229 |
| 6,330,590 B1 | 12/2001 | Cotten | |

OTHER PUBLICATIONS

Gary Boone "Concept features in Re:Agent, an intelligent email agent", Autonomous Agents 1998, pp. 141–148.*
Robert J. Hall "How to avoid unwanted email", ACM 1998, pp. 88–95.*
Cranor et al. "Spam!", ACM 1998, pp. 74–83.*
Chang et al "Knowledge–based message management system", ACM 1987, pp. 213–236.*
Ding et al "Centralized content–based web filtering and blocking: how far can it go?", IEEE 1999, pp. 115–119.*
Distributed Checksum Clearinghouse, various such pages from www.rhyolite.com/anti–spam/dcc, Dec. 7, 2001.
Vipul's Razor, version such pages from razor.sourceforge.net printed Dec. 19, 2001.

* cited by examiner

Primary Examiner—Safet Metjahic
Assistant Examiner—Uyen Le
(74) Attorney, Agent, or Firm—Vierra Magen Marcus Harmon & DeNiro LLP

(57) ABSTRACT

A file content classification system includes a digital ID generator and an ID appearance database coupled to receive IDs from the ID generator. The system further includes a characteristic comparison routine identifying the file as having a characteristic based on ID appearance in the appearance database. In a further aspect, a method for identifying a characteristic of a data file comprises the steps of: generating a digital identifier for the data file and forwarding the identifier to a processing system; determining whether the forwarded identifier matches a characteristic of other identifiers; and processing the data file based on said step of determination.

25 Claims, 2 Drawing Sheets

DISTRIBUTED CONTENT IDENTIFICATION SYSTEM

BACKGROUND OF THE INVENTION

1. Field of the Invention

The invention relates to the field of content identification for files on a network.

2. Description of the Related Art

With the proliferation and growth of the Internet, content transfer between systems on both public and private networks has increased exponentially. While the Internet has brought a good deal of information to a large number of people in a relatively inexpensive manner, this proliferation has certain downsides. One such downside, associated with the growth of e-mail in particular, is generally referred to as "spam" e-mail. Spam e-mail is unsolicited e-mail which is usually sent out in large volumes over a short period of time with the intent of inducing the recipient into availing themselves of sales opportunities or "get rich quick" schemes.

To rid themselves of spam, users may resort to a number of techniques. The most common is simple filtering using e-mail filtering which is built into e-mail client programs. In this type of filtering, the user will set up filters based on specific words, subject lines, source addresses, senders or other variables, and the e-mail client will process the incoming e-mail when it is received, or at the server level, and take some action depending upon the manner in which the filter is defined.

More elaborate e-mail filtering services have been established where, for a nominal fee, off-site filtering will be performed at a remote site. In one system, e-mails are forwarded offsite to a service provider and the automatic filtering occurs at the provider's location based on heuristics which are updated by the service provider. In other systems, offsite filtering occurs using actual people to read through e-mails and judge whether e-mail is spam or not. Other systems are hybrids, where heuristics are used and, periodically, real people review e-mails which are forwarded to the service to determine whether the e-mail constitutes "spam" within the aforementioned definition. In these hybrid services, personal reviews occur on a random basis and hence constitute only a spot check of the entire volume of e-mail which is received by the service. In systems where real people review e-mails, confidentiality issues arise since e-mails are reviewed by a third party who may or may not be under an obligation of confidentiality to the sender or recipient of the e-mail.

In addition, forwarding the entire e-mail including attachments to an outside service represents a high bandwidth issue since effectively this increases the bandwidth for a particular e-mail by three times: once for the initial transmission, the second time for the transmission to the service and the third time from the service back to server for redistribution to the ultimate recipient.

Further, senders of spam have become much more sophisticated at avoiding the aforementioned filters. The use of dynamic addressing schemes, very long-length subject lines and anonymous re-routing services makes it increasingly difficult for normal filtering schemes, and even the heuristics-based services discussed above, to remain constantly up-to-date with respect to the spammers' ever changing methods.

Another downside to the proliferation of the Internet is that it is a very efficient mechanism for delivering computer viruses to a great number of people. Virus identification is generally limited to programs which run and reside on the individual computer or server in a particular enterprise and which regularly scan files and e-mail attachments for known viruses using a number of techniques.

SUMMARY OF THE INVENTION

Hence, the object of the invention is to provide a content classification system which identifies content in an efficient, up-to-date manner.

The further object of the invention is to leverage the content received by other users of the classification system to determine the characteristic of the content.

Another object of the invention is to provide a service which quickly and efficiently identifies a characteristic of the content of a given transmission on a network at the request of the recipient.

Another object of the invention is to provide the above objects in a confidential manner.

A still further object is to provide a system which operates with low bandwidth.

These and other objects of the invention are provided in the present invention. The invention, roughly described, comprises a file content classification system. In one aspect the system includes a digital ID generator and an ID database coupled to receive IDs from the ID generator. The system further includes a characteristic comparison routine identifying the file as having a characteristic based on ID appearance in the appearance database.

In a particular embodiment, the file is an e-mail file and the system utilizes a hashing process to produce digital IDs. The IDs are forwarded to a processor via a network. The processor performs the characterization and determination steps. The processor then replies to the generator to enable further processing of the email based on the characterization reply.

In a further aspect, the invention comprises a method for identifying a characteristic of a data file. The method comprises the steps of: generating a digital identifier for the data file and forwarding the identifier to a processing system; determining whether the forwarded identifier matches a characteristic of other identifiers; and processing the e-mail based on said step of determination.

In yet another aspect, the invention comprises a method for providing a service on the Internet, comprising: collecting data from a plurality of systems having a client agent on the Internet to a server having a database; characterizing the data received relative to information collected in the database; and transmitting a content identifier to the client agent. In this aspect, said step of collecting comprises collecting a digital identifier for a data file. In addition, said step of characterizing comprises: tracking the frequency of the collection of a particular identifier; characterizing the data file based on said frequency; storing the characterization; and comparing collected identifiers to the known characterization

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

The present invention provides a distributed content classification system which utilizes a digital identifier for each piece of content which is sought to be classified, and characterizes the content based on this ID. In one aspect of the system, the digital identifier is forwarded to a processing system which correlates any number of other identifiers through a processing algorithm to determine whether a particular characteristic for the content exists. In essence, the classification is a true/false test for the content based on the query for which the classification is sought. For example, a system can identify whether a piece of e-mail is or is not spam, or whether the content in a particular file matches a given criteria indicating it is or is not copyrighted material or contains or does not contain a virus.

While the present invention will be discussed with respect to classifying e-mail messages, it will be understood by those of average skill in the art that the data classification system of the present invention can be utilized to classify any sort of text or binary data which resides on or is transmitted through a system.

Figure 1:
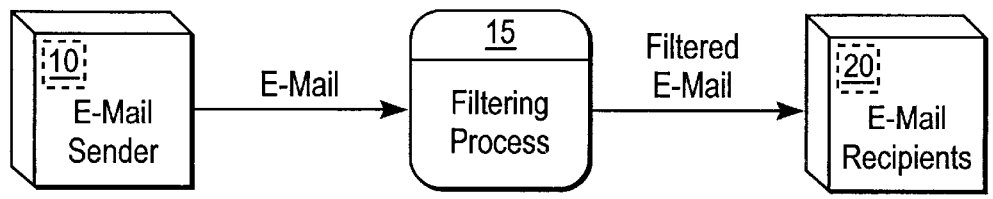
FIG. 1 is a block diagram indicating the system in filtering e-mail to identify content in accordance with the present invention.

FIG. 1 is a high level depiction of the present invention wherein an e-mail sender 10 transmits an e-mail which is intercepted by a filtering process/system 15 before being forwarded to the sender. The system has the ability to act on the e-mail before the recipient 20 ever sees the message.

Figure 2:
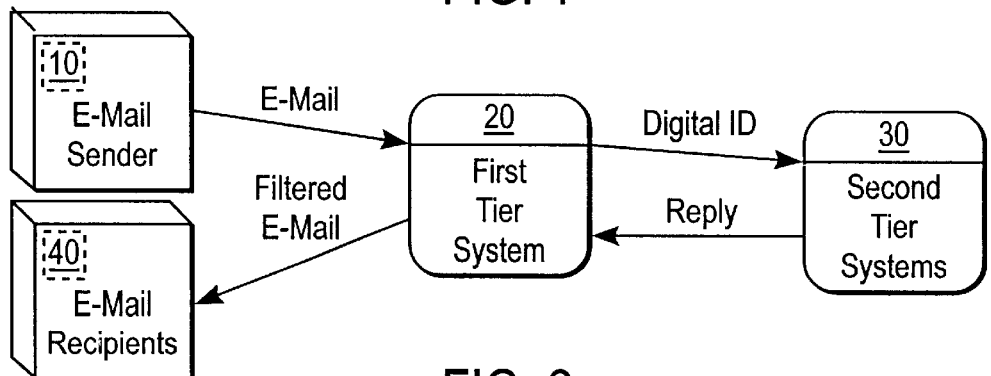
FIG. 2 is a block diagram illustrating the process of the present invention.

FIG. 2 illustrates the general process of the present invention in the e-mail context when an e-mail sender 10 transfers an e-mail to its intended recipient 40, the message arrives at a first tier system 20 which in this example may represent an e-mail server. Normally (in the absence of the system of the present invention), the first tier system 20 will transmit an e-mail directly to the intended recipient when the recipient's e-mail client application requests transmission of the e-mail. In the present invention, a digital identifier engine on the first tier system cooperating with the e-mail server will generate a digital identifier which comprises, in one environment, a hash of at least a portion of the e-mail. The digital identifier is then forwarded to a second tier system 30. Second tier system 30 includes a database and processor which determines, based on an algorithm which varies with the characteristic tested, whether the e-mail meets the classification of the query (e.g. is it spam or not?).

Based on the outcome of this algorithm, a reply is sent from the second tier system 30 to the first tier system 20, where the system then processes the e-mail in accordance with the regenerated description by the user based on the outcome of the filter. The result can be as shown in FIG. 2, the filtered e-mail product being forwarded to the e-mail recipient. Other options for disposition of the e-mail depending upon the outcome of the algorithm computed at second tier system 30 are described below.

It should be understood with reference to FIGS. 1 and 2 that the external e-mail sender can be any source of electronic mail or electronic data sent to the filtering process from sources outside the system. The e-mail recipients 40 represent the final destination of electronic data that passes through the filtering process.

In one aspect, the system may be implemented in executable code which runs on first tier system 20 and generates digital IDs in accordance with the MD5 hash fully described at http://Awww.w3.org/TR/1998/Rec-DSig-label/MD5_1_6. It should be recognized however that any hashing algorithm can be utilized. In one embodiment, the digital ID generated by the MD5 hash is of the entire subject line up to the point where two spaces appear, the entire body, and the last 500 bytes of the body of the message. It should be further understood that the digital ID generated may be one hash, or multiple hashes, and the hashing algorithm may be performed on all or some portion of the data under consideration. For example, the hash may be of the subject line, some number of characters of the subject line, all of the body or portions of the body of the message. It should further be recognized that the digital ID is not required to be of fixed length.

The first tier executable may be run as a separate process or as a plug-in with the e-mail system running on a first tier system 20. In one embodiment, the executable interfaces with a commonly used mail server on a running system such as a first tier system 20 is known as Sendmail™. A common set of tools utilized with Sendmail™ is Procmail. (http://www.ii.com/internet/robots/procmail). In one aspect of the system of the present invention, the executable may interface with Sendmail™ and Procmail. In such an embodiment, a configuration file (such as a sendmail.cf) includes a line of code which instructs the Procmail server program to process incoming e-mails through the first tier site e-mail executable to generate and transport digital IDs to the second tier system, receive its reply, and instruct the Procmail to process or delete the message, as a result of the reply message.

It should be understood that the executable may be written in, for example, perl script and can be designed to interact with any number of commercial or free e-mail systems, or other data transfer systems in applications other than e-mail.

The digital ID usage in this context reduces bandwidth which is required to be transported across the network to the second tier system. Typically, the ID will not only contain the hashed data, but may include versioning information which informs the second tier system 30 of the type of executable running on the first tier system 20.

In addition, the reply of the second tier system to the first tier system may be, for example, a refusal of service from the second tier system 30 to the first tier system 20 in cases where the first tier system is not authorized to make such requests. It will be recognized that revenue may be generated in accordance with the present invention by providing the filtering service (i.e. running the second tier service process and maintaining the second tier database) for a fee based on volume or other revenue criteria. In this commercial context, the reply may be a refusal of service of the user of the first tier system 20 which has exceeded their allotted filtering quota for a given period.

Figure 3:
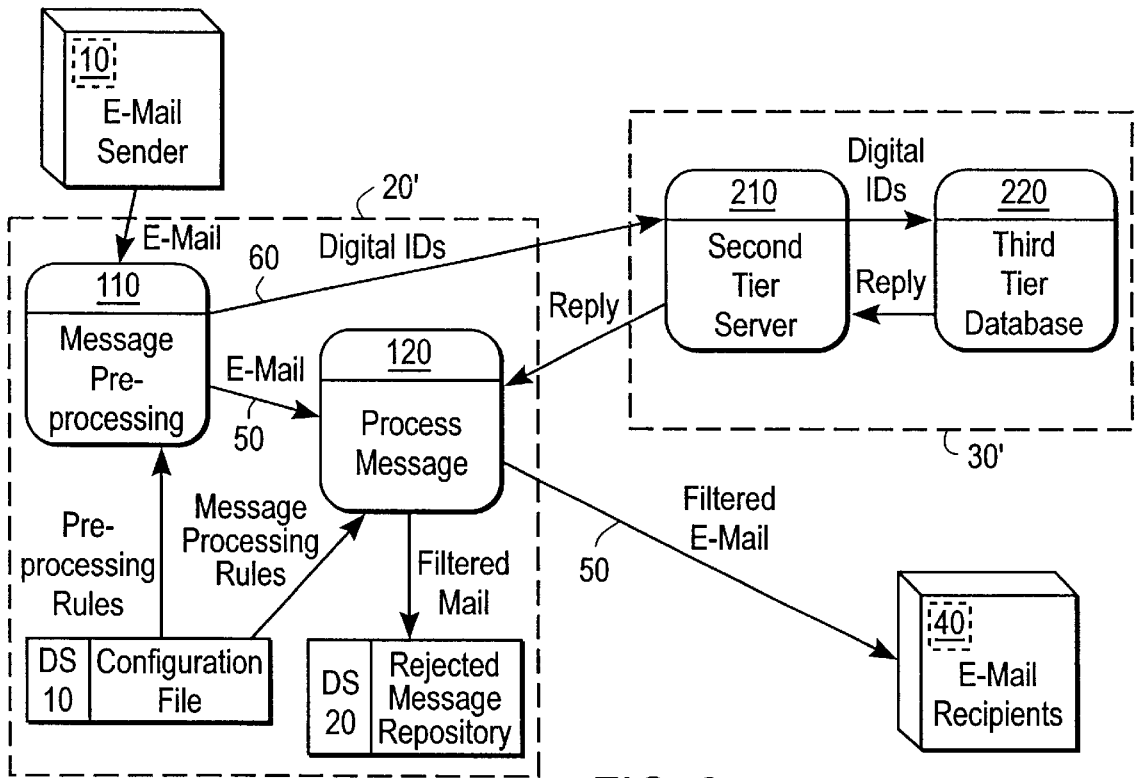
FIG. 3 is a block diagram illustrating in additional detail the method and apparatus of the present invention.

FIG. 3 shows a second embodiment of the system of the present invention. In FIG. 3, the first tier system is broken down into three components including a message preprocessing section 110, a message processing section 120, a configuration file DS10. In this example, the e-mail from sender 10 is first diverted to message preprocessing 110. Preprocessing algorithm is configured with rules from configuration file DS10. These rules are guidelines on how and when, for example, to generate digital IDs from the e-mail which is received. Message preprocessing receives the email from the e-mail sender 10 and generates digital IDs based on the preprocessing rules from DS10. DS10 is a configuration file which stores configuration rules (before preprocessing and postprocessing) for the first tier system 20. The message processing rules may include guidelines on how to dispose of those e-mails classified as spam. For example, a message may be detected, and may be forwarded to a holding area for electronic mail that has been deemed to be spam by second tier system 30, have the word "SPAM" added to the subject line, moved to a separate folder, and the like. In this example, message preprocessing rules include rules which might exempt all e-mails from a particular destination or address from filtering by the system. If a message meets such exemption criteria, the message is automatically forwarded, as shown on line 50, directly to message processing 120 for forwarding directly onto the e-mail recipient 40. Such rules may also comprise criteria for forwarding an e-mail directly to a rejected message depository DS20.

If a preprocessing rule does not indicate a direct passage of a particular e-mail through the system, one or more digital identifiers will be generated as shown at line 66 and transmitted to the second tier system 30'. In the example shown at FIG. 3, second tier system 30' includes a second tier server 210 in a third tier database 220. In this example, the second tier server relays digital IDs and replies between preprocessing and the message processing 120. The example shown in FIG. 3 is particularly useful in an Internet based environment where the second tier server 210 may comprise a web server which is accessible through the Internet and the third tier database 220 is shielded from the Internet by the second tier server through a series of firewalls or other security measures. This ensures that the database of digital ID information which is compiled at the third tier database 220 is free from attack from individuals desirous of compromising the security of this system.

In this case, second tier server 210 forwards the digital ID directly to the third tier database which processes the IDs based on the algorithm for testing the data in question. The third tier database generates a reply which is forwarded by the second tier server back to message processing 120. Message processor 120 can then act on the e-mail by either sending filtered e-mail to the e-mail recipient, sending the filtered e-mail to the rejected message depository DS20 or acting on the message in accordance with user-chosen configuration settings specified in configuration file DS10.

In the environment shown in FIG. 3, the configuration file DS1 10 on the first tier allows other decisions about the e-mail received from the e-mail sender 10 to be made, based on the reply from second tier 30. For example, in addition to deleting spam e-mail, the subject line may be appended to indicate that the e-mail is "spam," the e-mail may be held in a quarantine zone for some period of time, an auto reply generated, and the like. In addition, the message preprocessing and message processing rules allow decisions on e-mail processing to account for situations where second tier system 30' is inaccessible. Decisions which may be implemented in such cases may include "forward all e-mails," "forward no e-mails," "hold for further processing," and the like.

In an Internet based environment, the second tier server 30 may transmit a digital identification and other information to the third tier database 220 by means of the HTTP protocol. It should be recognized that other protocols may be used in accordance with the present invention. The third tier database 220 may be maintained on any number of different commercial database platforms. In addition the third tier database may include system management information, such as client identifier tracking, and revenue processing information. In an unique aspect of the present invention in general, the digital IDs in third tier database 22 are maintained on a global basis. That is, all first tier servers which send digital IDs to second tier servers 210 contribute data to the database and the processing algorithm running on the third tier system. In one embodiment, where spam determination is the goal, the algorithm computes, for example, the frequency with which a message (or, in actuality, the ID for the message), is received within a particular time frame. For example, if a particular ID indicating the same message is seen some number of times per hour, the system classifies the message (and ID) as spam. All subsequent IDs matching the ID classified as spam will now cause the system 30' to generate a reply that the e-mail is spam. Each client having a first tier system 20' which participates in the system of the present invention benefits from the data generated by other clients. Thus, for example, if a particular client receives a number of spam e-mails meeting the frequency requirement causing the system to classify another client having a first tier system 20' which then sees a similar message will automatically receive a reply that the message is spam.

It should be recognized that in certain cases, large reputable companies forward a large block of e-mails to a widespread number of users, such as, for example information mailing list servers specifically requested by e-mail receivers. The system accounts for such mailing list application on both the area and second tier system levels. Exceptions may be made in the algorithm running on the third tier database 220 to take into account the fact that reputable servers should be allowed to send a large number of e-mails to a large number of recipients at the destination system 20'. Alternatively, or in conjunction with such exceptions, users may define their own exceptions via the DS10 configuration. As a service, any number of acceptable sources such as, for example, the Fortune 1000 companies' domain names may be characterized as exempted "no spam" sites, and users can choose to "trust" or "not trust" server side settings.

While the aforementioned embodiment utilizes a frequency algorithm to determine whether a message is spam, additional embodiments in the algorithm can analyze messages for the frequency of particular letters or words, and/or the relationship of the most common words to the second most common words in a particular message. Any number of variants of the algorithm may be used.

It should be further recognized that the second tier server can be utilized to interface with the value added services, such as connecting the users to additional mailing lists and reference sources, providing feedback on the recipients' characteristics to others, and the like.

Figure 4:
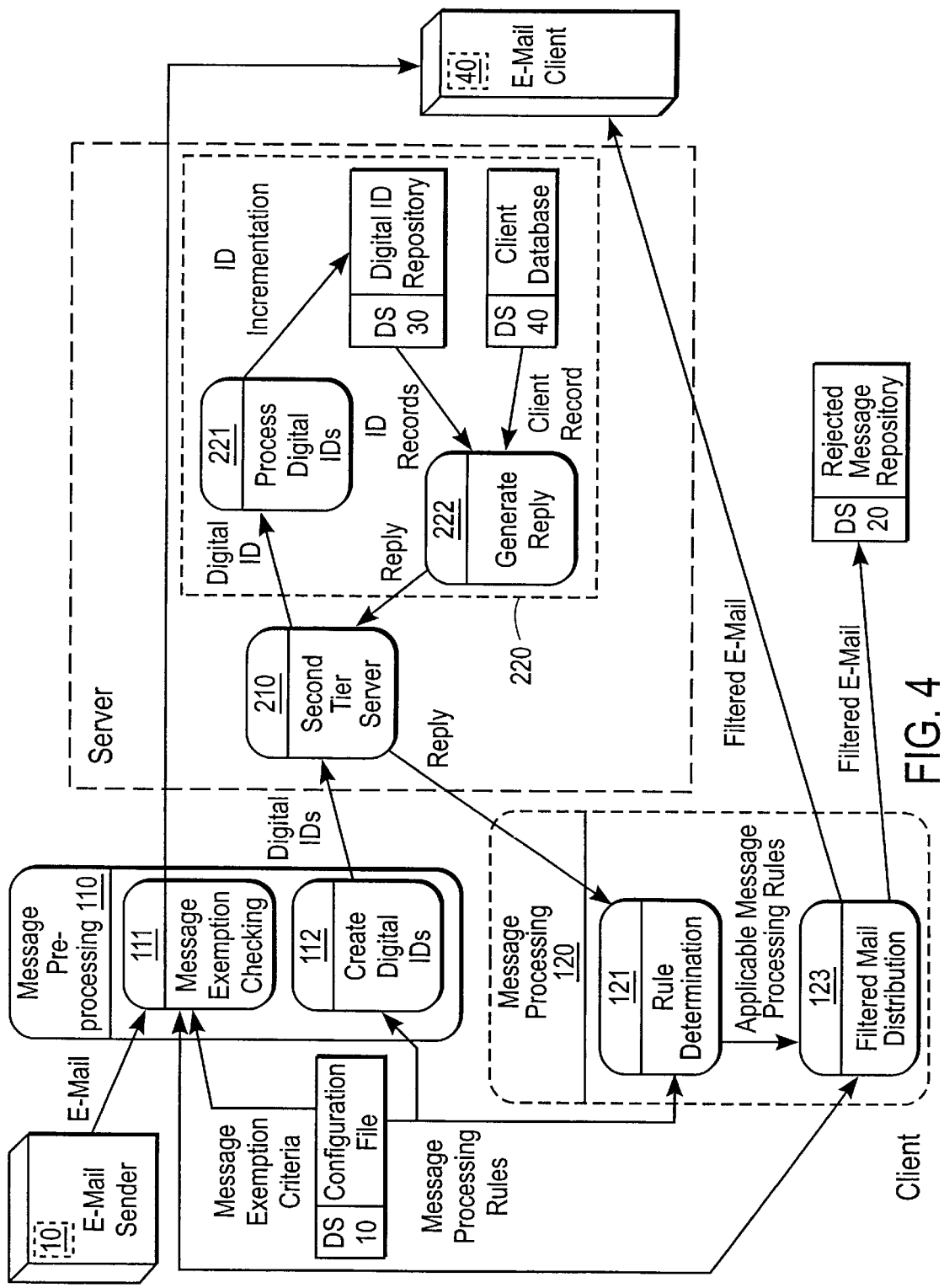
FIG. 4 is a block diagram illustrating a second embodiment of the method and apparatus of the present invention.

FIG. 4 shows a further embodiment of the invention and details how the server side system manipulates with the digital identifiers. In FIG. 4, the embodiment includes a DS10 configuration file which provides message exemption criteria and message processing rules to both message preprocessing and routine 110 message processing 120, respectively. Message preprocessing 110 may be considered as two components: message exemption checking 111 and digital ID creation 112. Both of these components function as described above with respect to FIG. 3 allowing for exempt e-mails to be passed directly to an e-mail recipient 40, or determining whether digital IDs need to be forwarded to second tier server 210. Replies are received by message processing algorithm 120 is acted on by rule determination algorithm 121, and e-mail filtering 123.

At the second tier system 30', digital IDs transmitted from second tier processor 210 are transmitted to a digital ID processor 221. In this embodiment, processor 221 increments counter data stored in DS30 for each digital ID per unit time. As the volume of messages processed by database 220 can be quite large, the frequency algorithm may be adjusted to recognize changes in the volume of individual messages seen as a percentage of the total message volume of the system.

The frequency data stored at DS30 feeds a reply generator 222 which determines, based on both the data in the DS30 and particular information for a given client, (shown as data record DS40) whether the reply generated and forwarded to second tier server 210 should indicate that the message is spam or not. Configuration file DS40 may include rules, as set forth above, indicating that the reply from the second tier server 210 is forwarded to rule determination component of message processor 120 which decides, as set forth above, how to process the rule if it is in fact determined that it is spam. The filtered e-mail distribution algorithm forwards the e-mail directly to the e-mail client 40 or to the rejected message repository as set forth above.

A key feature of the present invention is that the digital IDs utilized in the data identifier repository DS30 are drawn from a number of different first tier systems. Thus, the greater number of first tier systems which are coupled to the second tier server and subsequent database 220, the more powerful the system becomes.

It should be further recognized that other applications besides the detection of spam e-mail include the detection of viruses, and the identification of copyrighted material which are transmitted via the network.

Moreover, it should be recognized that the algorithm for processing digital identifiers and the data store DS30 are not static, but can be adjusted to look for other characteristics of the message or data which is being tested besides frequency.

Hence, the system allows for leveraging between the number of first tier systems or clients coupled to the database to provide a filtering system which utilizes a limited amount of bandwidth while still providing a confidential and powerful e-mail filter. It should be further recognized that the maintainer of the second and third tier systems may generate revenue for the service provided by charging a fee for the service of providing the second tier system process.

Still further, the system can collect and distribute anonymous statistical data about the content classified. For example, where e-mail filtering is the main application of the system, the system can identify the percentage of total e-mail filtered which constitutes spam, where such e-mail originates, and the like, and distribute it to interested parties for a fee or other compensation.

What is claimed is:

1. A file content classification system comprising:
    a plurality of agents, each agent including a file content ID generator creating file content IDs using a mathematical algorithm, at least one agent provided on one of a plurality of clients;
    an ID appearance database, provided on a server, coupled to receive file content IDs from the agents; and
    a characteristic comparison routine on the server, identifying a characteristic of the file content based on the appearance of the file content ID in the appearance database and transmitting the characteristic to the client agents.

2. The content classification system of claim 1 wherein said ID generator comprises a hashing algorithm.

3. The content classification system of claim 2 wherein said hashing algorithm is the MD5 hashing algorithm.

4. The content classification system of claim 2 wherein said ID appearance database tracks the frequency of appearance of a digital ID.

5. The content classification system of claim 1 wherein said plurality of agents are coupled to said database via a combination of public and private networks.

6. The content classification system of claim 5 wherein said database is coupled to an intermediate server which is coupled to said plurality of agents.

7. The content classification system of claim 6 wherein said intermediate server is a web server.

8. The content classification system of claim 1 wherein said characteristic comprises junk e-mail and said characteristic is defined by a frequency of appearance of a file content ID.

9. A method for identifying characteristics of data files, comprising:
    receiving, on a processing system, file content identifiers for data files from a plurality of file content identifier generator agents, each agent provided on a source system and creating file content IDs using a mathematical algorithm, via a network;
    determining, on the processing system, whether each received content identifier matches a characteristic of other identifiers; and
    outputting, to at least one of the source systems responsive to a request from said source system, an indication of the characteristic of the data file based on said step of determining.

10. The method of claim 9 wherein said file content identifier generates an identifier by hashing at least a portion of the data file.

11. The method of claim 10 wherein said hashing comprises using the MD5 hash.

12. The method of claim 10 wherein said step of generating comprises hashing multiple portions of the data file.

13. The method of claim 9 wherein each said data file is an email message and said step of determining comprises determining whether said email is SPAM.

14. The method of claim 9 wherein said step of determining identifies said e-mail as SPAM by tracing the rate per unit time a digital ID is generated.

15. The method of claim 14 wherein said method further includes the step of instructing said plurality of source systems to perform an action with the email based on said determining step.

16. A method of filtering an email message, comprising:
    receiving, on a second computer, a digital content identifier created using a mathematical algorithm unique to the message content from at least two of a plurality of first computers having digital content ID generator agents;
    comparing, on the second computer, the digital content identifier to a characteristic database of digital content identifiers received from said plurality of first computers to determine whether the message has a characteristic; and
    responding to a query from at least one of said plurality of computers to identify the existence or absence of said characteristic of the message based on said comparing.

17. The method of claim 16 wherein said second computer is coupled to said plurality of first computers by a combination of public and private networks.

18. The method of claim 17 wherein said step of receiving includes receiving identifiers from said plurality of first systems via an intervening Web server.

19. The method of claim 18 wherein said plurality of systems are coupled by the Internet.

20. The method of claim 16 wherein said step of comparing comprises determining the frequency of a particular ID occurring in a time period, classifying said ID as having a characteristic, and comparing digital content identifiers to said classified IDs.

21. A file content classification system for a first computer and a second computer coupled by a network, comprising:
 a client agent file content identifier generator on the first computer, the file content identifier comprising a computed value of at least two non-contiguous sections of data in a file; and
 a server comparison agent and data-structure on the second computer receiving identifiers from the client agent and providing replies to the client agent;
 wherein the client agent processes the file based on replies from the server comparison agent.

22. A method for providing a service on the Internet, comprising:
 collecting data on a processing system from a plurality of systems having a client agent generating digital content identifiers created using a mathematical algorithm for each of a plurality of files on the Internet to a server having a database;
 characterizing the files on the server system based on said digital content identifiers received relative to other digital content identifiers collected in the database; and
 transmitting a substance identifier from the server to the client agent indicating the presence or absence of a characteristic in the file.

23. The method of claim 22 wherein said step of collecting comprises collecting a digital identifier for a data file.

24. The method of claim 23 wherein said file content is an e-mail.

25. The method of claim 23 wherein said step of characterizing comprises:
 tracking the frequency of the collection of a particular identifier,
 characterizing the data file based on said frequency,
 storing the characterization; and
 comparing collected identifiers to the known characterization.

* * * * *

UNITED STATES PATENT AND TRADEMARK OFFICE
CERTIFICATE OF CORRECTION

PATENT NO.    : 6,460,050 B1
DATED         : October 1, 2002
INVENTOR(S)   : Pace et al.

It is certified that error appears in the above-identified patent and that said Letters Patent is hereby corrected as shown below:

Column 7,
Line 65, after "claim" and before "wherein" delete "2" and substitute -- 1 --

Signed and Sealed this

Thirty-first Day of August, 2004

JON W. DUDAS
*Director of the United States Patent and Trademark Office*